United States Patent
Acuna et al.

(10) Patent No.: US 9,218,402 B2
(45) Date of Patent: Dec. 22, 2015

(54) METHOD FOR CONVERTING MOF FILES FOR COMPATIBILITY WITH INCOMPATIBLE CIM IMPLEMENTATIONS

(75) Inventors: Jorge D. Acuna, Vail, AZ (US); Lourdes M. Gee, Tucson, AZ (US); Jason J. Graves, Morrisville, NC (US); Kevan D. Holdaway, Hillsborough, NC (US); Nhu T. Nguyen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 12/045,479

(22) Filed: Mar. 10, 2008

(65) Prior Publication Data

US 2009/0228503 A1 Sep. 10, 2009

(51) Int. Cl.
*G06F 17/30* (2006.01)
(52) U.S. Cl.
CPC .............................. *G06F 17/30569* (2013.01)
(58) Field of Classification Search
CPC ................................................. G06F 17/30569
USPC ............................ 707/999.101, 101, E17.006
See application file for complete search history.

(56) References Cited

U.S. PATENT DOCUMENTS

| | | | |
|---|---|---|---|
| 6,636,877 B1 * | 10/2003 | Doleac et al. ........................ 1/1 |
| 2003/0188293 A1 * | 10/2003 | Boucher ........................ 717/114 |
| 2004/0068714 A1 * | 4/2004 | Deimel et al. ................. 717/101 |
| 2004/0068733 A1 * | 4/2004 | Longbardi ..................... 719/316 |
| 2005/0235071 A1 | 10/2005 | Zarenin |
| 2006/0129518 A1 * | 6/2006 | Andreev et al. .................... 707/1 |
| 2006/0271911 A1 * | 11/2006 | Palapudi et al. .............. 717/106 |
| 2007/0130235 A1 | 6/2007 | Rakoff et al. |
| 2007/0226232 A1 * | 9/2007 | Yin et al. ....................... 707/100 |
| 2007/0255751 A1 * | 11/2007 | Bansal et al. ............. 707/103 R |

OTHER PUBLICATIONS

WMI and CIM Concepts and Terminology, http://www.microsoft.com/whdc/archive/WMI-CIM.mspx, Jan. 24, 2008, pp. 1-6.
XSL Transformations (XSLT), Version 1.0, http://www.w3.org/TR/xslt, Jan. 24, 2008, pp. 1-57.
Compiling MOF files into the WMI repository, http://publib.boulder.ibm.com/infocenter/dirinfo/toolkit/topic/com.ibm.director.sdk.tl.doc/, Jan. 24, 2008, pp. 1-2.
Pegasus Developers Manual, The Open Group, Pegasus CIM Object Broker Documentation, http://www.openpegasus.org/manual/FunctionalFlow.html, Jan. 24, 2008, pp. 1-2.
Common Information Model (computing)—Wikipedia, the free encyclopedia, http://en.wikipedia.org/wiki/Common_Information_Model_%28computing%29, Jan. 24, 2008, pp. 1-3.

\* cited by examiner

*Primary Examiner* — Shiow-Jy Fan
(74) *Attorney, Agent, or Firm* — Dale F. Regelman; Quarles & Brady LLP

(57) ABSTRACT

A method for converting CIM MOF files from a first CIM implementation to a second CIM implementation includes receiving at least a first MOF file in a first format, and replacing at least a first parameter within the received file with a second parameter. The first format and first parameter are compatible with the first CIM implementation and the second parameter is associated with the second CIM implementation. The method further includes creating a transformed file based on the replacing, determining at least a first rule set associated with the second CIM implementation, and comparing the transformed file to the determined first rule set. Additionally, the method includes converting the transformed file to a second format based on the comparison, wherein the second format is compatible with the second CIM implementation.

16 Claims, 4 Drawing Sheets

100

200

300

400

METHOD FOR CONVERTING MOF FILES FOR COMPATIBILITY WITH INCOMPATIBLE CIM IMPLEMENTATIONS

FIELD OF INVENTION

The present invention generally relates to Common Information Management ("CIM") implementations. More specifically, the invention relates to converting Managed Object Framework ("MOF") files to allow for compatibility with incompatible CIM implementations.

BACKGROUND OF THE INVENTION

The CIM model of software is an open standard that controls how an IT environment represents managed elements. CIM is similar to an object-oriented standard for IT environments that assists in managing multiple elements that are not necessarily from the same manufacturer or provider. Multiple parties, such as administrators, can exchange management information using a common interface, as well as actively control the managed objects using the same CIM interface. Use of the common interface reduces the need to utilize expensive conversion operations and complex software.

The CIM standard originates with the Distributed Management Task Force ("DTMF"). This CIM standard is used by a plurality of parties to distribute their own implementation of CIM. The DTMF also promulgates its own CIM implementation, the Web-Based Enterprise Management ("WBEM"). The Common Information Model Object Broker ("CIMOM") brokers CIM objects between a number of sources and destinations. A CIM object should be a representation, or model, of a managed resource, such as a printer, disk drive, or central processing unit (CPU). In at least one CIM implementation, such as the Pegasus implementation, CIM objects are represented internally as C++ classes. The CIMOM transfers information between WBEM clients, the CIM Object Manager Repository, and managed resources.

FIG. 3 illustrates a sample CIM architecture 300 including management infrastructure 310 and CIM providers 325 and 335. The management infrastructure 310 includes CIMOM 315 and a CIMOM object repository 320. CIMOM 315 provides applications with uniform access to management data. Providers 325, 335 function as intermediaries between CIMOM 315 and managed objects 340, 345. Managed objects 340, 345 are any appropriate managed objects or systems, such as computer systems, computer networks, monitors, printers, databases, or the like. The providers 325, 335 supply CIMOM 315 with data from managed objects 340, 345, handle requests on behalf of management applications 310, and generate event notifications.

When a request is made from management application 310 for information about one of the managed systems 340, 345, CIMOM 315 retrieves information about the class from the CIM repository 320 and the requested information is returned. Based on the information returned, CIMOM 315 either secures the information from the CIM repository 320 or providers 325, 335. Several types of providers that can plug into the management infrastructure 310, such as Class, Instance, and Property providers are defined in CIM implementations. Class providers define the corresponding Management Object, or class, in the CIMOM object repository 320 and identify and populate instances of this class. Instance providers define the instances of a pre-defined Management Object and populate their properties with the values obtained or pertinent to the instances of the corresponding managed objects. If the object definition changes, the instance provider code must also be changed accordingly. Property providers supply the properties of a certain category of managed objects to the management infrastructure. These properties should be mapped to instances of some Managed Objects outside and independently of the provider, generally through a MOF script.

While CIM implementations are a valuable asset to the development community, the multiplicity of implementations leads to incompatible implementations. Thus, it is common for development projects, especially discontinuous projects performed by disparate vendors, to encounter compatibility issues.

Currently, CIM schema MOFs from the DMTF website are not completely compatible with the Windows WMI CIMOM. This is because most of the CIM MOFs are tested with Pegasus CIMOM. But when using the WMI CIMOM, the CIM schema and provider MOFs must be edited to meet the rules and requirements for WMI CIMOM on Windows. Currently, there is no program or tool that will do this for the user. So the user must manually edit the MOF files to make them compatible with Windows WMI.

Integrations with the WMI+A components on Windows require multiple steps, such as the steps that follow. While the steps as described assume that the actual providers will be either Pegasus C++ (implicitly managed by the PPA<TODO: link>) or CMPI (implicitly managed by the CPA<TODO: link>), other steps are required where this assumption is not satisfied.

First, the qualifiers must be amended to ensure compatibility. Provider qualifiers are used to link a native WMI provider with a class in the WMI repository. The WMI+A stack includes an internal registration provider that will dynamically place this qualifier on any class registered by provider. There is no need for Pegasus and CMPI providers to add this qualifier to their classes.

The keys must be declared to ensure compatibility. The CIM standard only allows one class in a hierarchy to declare keys. Once a class has declared a property a key, subclasses can not add or remove keys. The WMI compiler is very strict on this rule. In a subclass, you can not mark a property that is a key redundantly.

Example: (GOOD)

```
class Parent
{
 [key]
  string Identifier;
};
class Child : Parent
{
  string NewProperty; // new non-key properties are okay
};
```

Example (BAD):

```
class Parent
{
 [key]
  string Identifier;
};
class Child : Parent
{
 [key]
  string Identifier; // redundant key definition is technically legal but will
be rejected by mofcomp
  string NewProperty; // new non-key properties are okay
};
```

Since some of the DMTF MOFs redundantly mark some properties as keys, they will need to be edited to remove the redundant key qualifier. The MOFs should compile as expected on WMI and other compilers such as Pegasus's cimmof. Overrides are still allowed.

Windows requires methods to have the Implemented qualifier when a provider supports a given method. This is simple when the class a provider supports also defines the method, but more complex when the method is inherited. When a subclass implements a method defined by a parent class, many times just adding the Implemented qualifier for the method in the subclass causes the mofcomp error WBEM_E_PROPAGATED_METHOD. This error means that an attempt was made to reuse an existing method name from a parent class and the signatures do not match. During the mofcomp of the parent class on Windows, an additional information of ToSubClass is added to method signatures, resulting in a mismatch causing an error. Currently, to address this issue, two MOFs are needed for these scenarios, one for Windows and one for non-Windows systems. The Windows MOF file has this additional information of ToSubClass added for the subclass method so that the mofcomp does not complain.

All classes that are not managed by a provider or the repository (i.e., static instances), should have the Abstract qualifier. There are some rare exceptions to this such as when a parent classes already has this qualifier and marked it as non-overrideable, but that will not be covered here. The purpose of the qualifier is to tell WMI there is no provider.

Example (GOOD):
[Abstract]

```
class Sample_ParentClass
{
  string Id;
};
class Sample_ChildClass : Sample_ParentClass
{
};
```

This is most often needed when one creates a new namespace and adds a standard CIM schema, which only marks some classes as Abstract. On Windows, it's best to simply mark all standard CIM classes (those that start with CIM_) as Abstract.

<TODO: Link to Sample Shell Script>
Example (BAD):
//left out abstract

```
class Sample_ParentClass
{
  string Id;
};
class Sample_ChildClass : Sample_ParentClass
{
};
```

In some translations, calls such as enumerateInstance appear to succeed but the call is never passed to the PPA/CPA and, consequently, the provider. Most often the WMI return code is WBEM_S_NO_ERROR yet 0 instances are returned. When the Abstract and Provider-Dynamic qualifiers are missing from a class, WMI acts as the default provider for it and uses the repository to store the information. And, since in WMI subclass only overrides parents (not adding new instances), there is no need to query subclasses if the parent returns 0 instances. It is possible that if the parent had 1 instance, then subclasses would be called to check for any overrides. Explicitly adding the Abstract qualifiers to unmanaged classes can resolve this problem.

All "standard" CIM indications derive from WMIA_ExtrinsicEvent, which derives from_ExtrinsicEvent. This is necessary to link WMI's internal alerting mechanisms to that of the standards', and to scope that link to the WMI+A stack only.

In short, the translator must compile the MOF to create the namespace, compile the schema MOF into the namespace, compile the provider schema into the namespace, run cimsubscribe for the subscriptions and filters, and compile the registration MOFs. This is a long and tedious process especially where the exemplary MOF includes hundreds of CIM schema MOFs.

First, the process requires changes to compile DMTF Parent CIMv211 MOFs using Windows WMI mofcomp tool:

1. comment out from cimv211.mof: //#pragma include ("Network/CIM_DNSSettingData.mof")
2. Add IN and OUT qualifiers on some of the classes to fix errors
3. Need to remove KEY qualifier on all the classes.

Next, the process requires changes on the user provider MOFs in order for the provider to work with WMI. These changes include copying the methods from parent MOFs (CIM Schema MOFs) to child MOFs (user provider MOFs) and adding the qualifier Implemented to each method. Additionally, the IN(false) and OUT(false) text are removed from all methods in the parent MOFs (CIM schema MOFs) and child MOFs (user provider MOFs) and the qualifier abstract is added to all the parent CIM schema MOFs. Other specific errors arise using third party MOFS, and windows wbemtest can be used to copy methods from a parent class into a child class, as well as removing other key qualifiers and removing out certain namespace mismatches for root addresses.

Despite these known steps, there has been a long felt need to improve the speed and cost of performing such steps. It is therefore a challenge to develop strategies for providing MOF compatibility among various CIM implementations to overcome these, and other, disadvantages.

SUMMARY OF THE INVENTION

One embodiment of the invention provides a method for converting CIM MOF files from a first CIM implementation to a second CIM implementation includes receiving at least a first MOF file in a first format, and replacing at least a first parameter within the received file with a second parameter. The first format and first parameter are compatible with the first CIM implementation and the second parameter is associated with the second CIM implementation. The method further includes creating a transformed file based on the replacing, determining at least a first rule set associated with the second CIM implementation, and comparing the transformed file to the determined first rule set. Additionally, the method includes converting the transformed file to a second format based on the comparison, wherein the second format is compatible with the second CIM implementation.

The foregoing embodiments and other embodiments, objects, and aspects as well as features and advantages of the present invention will become further apparent from the following detailed description of various embodiments of the present invention. The detailed description and drawings are merely illustrative of the present invention, rather than limit-

DETAILED DESCRIPTION OF THE PRESENT INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

Figure 1:
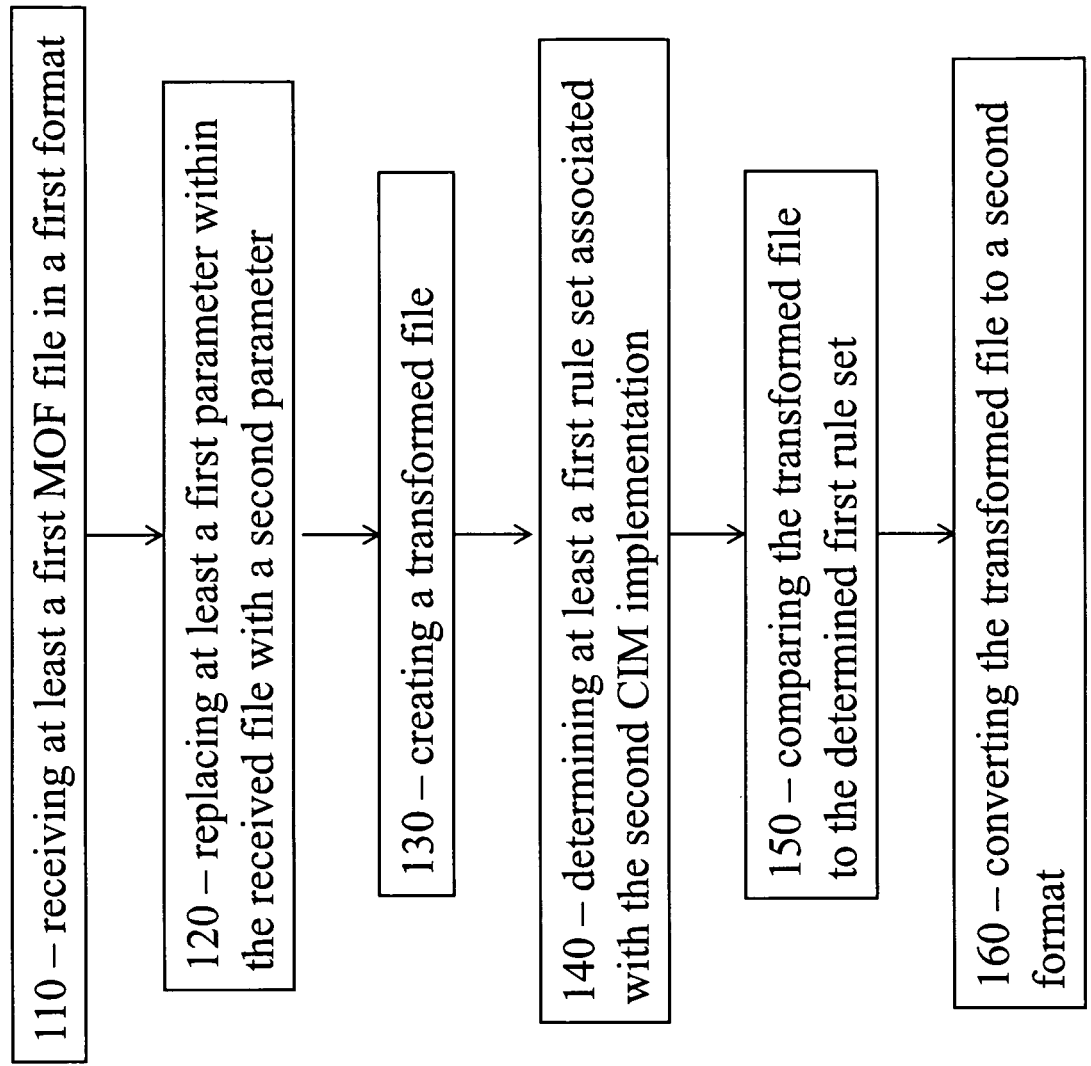
FIG. 1 is a flowchart illustrating one embodiment of a method for converting CIM MOF files from a first CIM implementation to a second CIM implementation; in accordance with one aspect of the invention.

FIG. 1 illustrates a flowchart of a method 100 for converting CIM MOF files from a first CIM implementation to a second CIM implementation. In one embodiment, the first CIM implementation is incompatible with the second CIM implementation. Method 100 includes receiving 110 at least a first MOF file in a first format. The first format is compatible with a first CIM implementation. In one embodiment, the first CIM implementation is a Pegasus CIM implementation. In one embodiment, the first MOF file is received at a central location, such as a server or bank of servers, via a network connection.

After receiving the first MOF file, method 100 replaces 120 at least a first parameter within the received file with a second parameter. The first parameter is associated with the first CIM implementation, whereas the second parameter is associated with the second CIM implementation. In one embodiment, step 120 includes operating a Java program that uses file edit classes from the java.io package to edit the MOF files to conform to the second CIM implementation. In one embodiment, a global search and replace is executed for appropriate replacements. For example, in an embodiment where the first CIM implementation is a Pegasus implementation and the second CIM implementation is a WMI implementation, the OUT(false) parameters for Pegasus need to be removed for compatibility with WMI, and an exemplary Java instruction for such a replacement, although any appropriate coding may be used, is:

tmp=filecontent.replaceAll("OUT\\(false)), ","")

Based on the replacement of the desired parameters, method 100 creates a transformed file at step 130. In one embodiment, creating the transformed file includes converting the first MOF file to an XML file after the replacing step of step 120. Additionally, at least a first rule set associated with the second CIM implementation is determined at step 140. The first rule set defines the translation rules necessary to ensure compatibility for the MOF file. In one embodiment, the first rule set is maintained by a third party. In one embodiment, the first rule set is accessed over a network, such as the Internet. The first rule set is determined, in one embodiment, based on a lookup table including a plurality of translation rules. For example, the lookup table includes an entry for translating Pegasus implementation MOFs to WMI implementation MOFs, an entry for translating WMI implementation MOFs to Pegasus implementation MOFs, and the like. In one embodiment, transforming the file includes executing an XSLT tool. XSLT is a language tool for transforming an XML document, and is a part of XSL which itself is a stylesheet language.

The transformed file is compared to the determined rule set at step 150. Based on the comparison, method 100 converts the transformed file to a second format, such that the second format is compatible with the second CIM implementation, at step 160. The conversion may include replacing commands, editing commands, editing parameters or the like. In one embodiment, the conversion includes use of an XSLT tool to convert the transformed document to a new XML file. In one embodiment, the new XML file is converted to a MOF compatible with the second CIM implementation.

Figure 2:
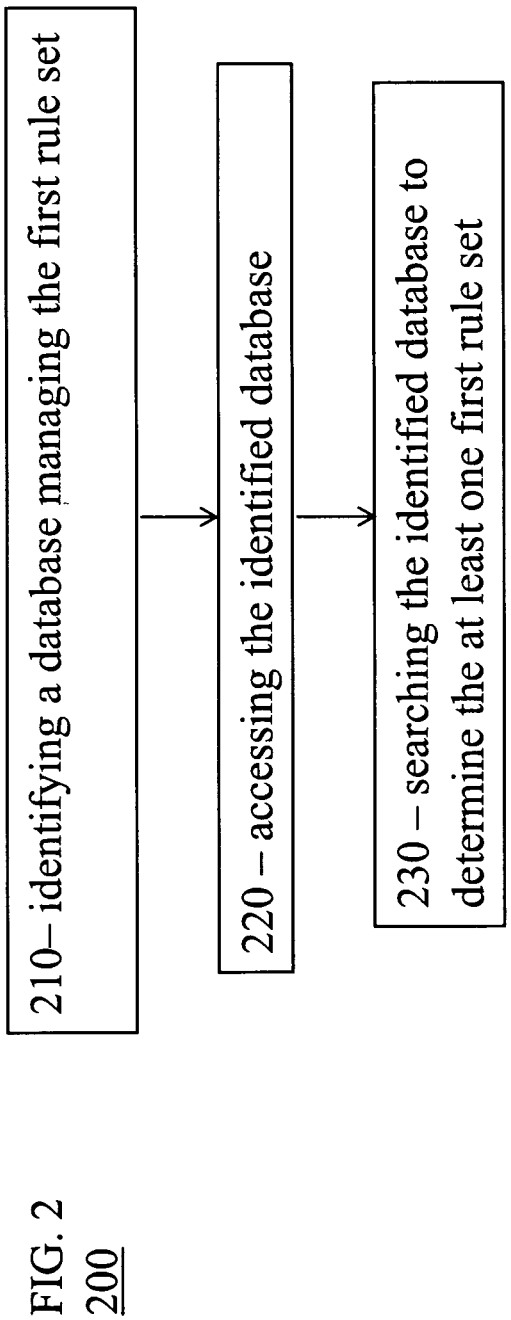
FIG. 2 is a flowchart illustrating one embodiment of a method for converting CIM MOF files from a first CIM implementation to a second CIM implementation; in accordance with one aspect of the invention.

FIG. 2. Illustrates one embodiment of a method 200 for determining at least a first rule set associated with the second CIM implementation, in accordance with another aspect of the invention. Method 200 includes identifying a database managing the first rule set at step 210. In one embodiment, the database is operated by a third party. In one embodiment, the database is identified by utilizing a lookup table that includes pointers to at least one database. Method 200 then accesses the identified database at step 220, and searches the identified database to determine the at least one first rule set at step 230. Appropriate search techniques are used to identify the rule set. In one embodiment, a data scraping tool is used to secure the rule set. In one embodiment, the database is accessed over a network. In one embodiment, the network is the Internet.

Figure 3:
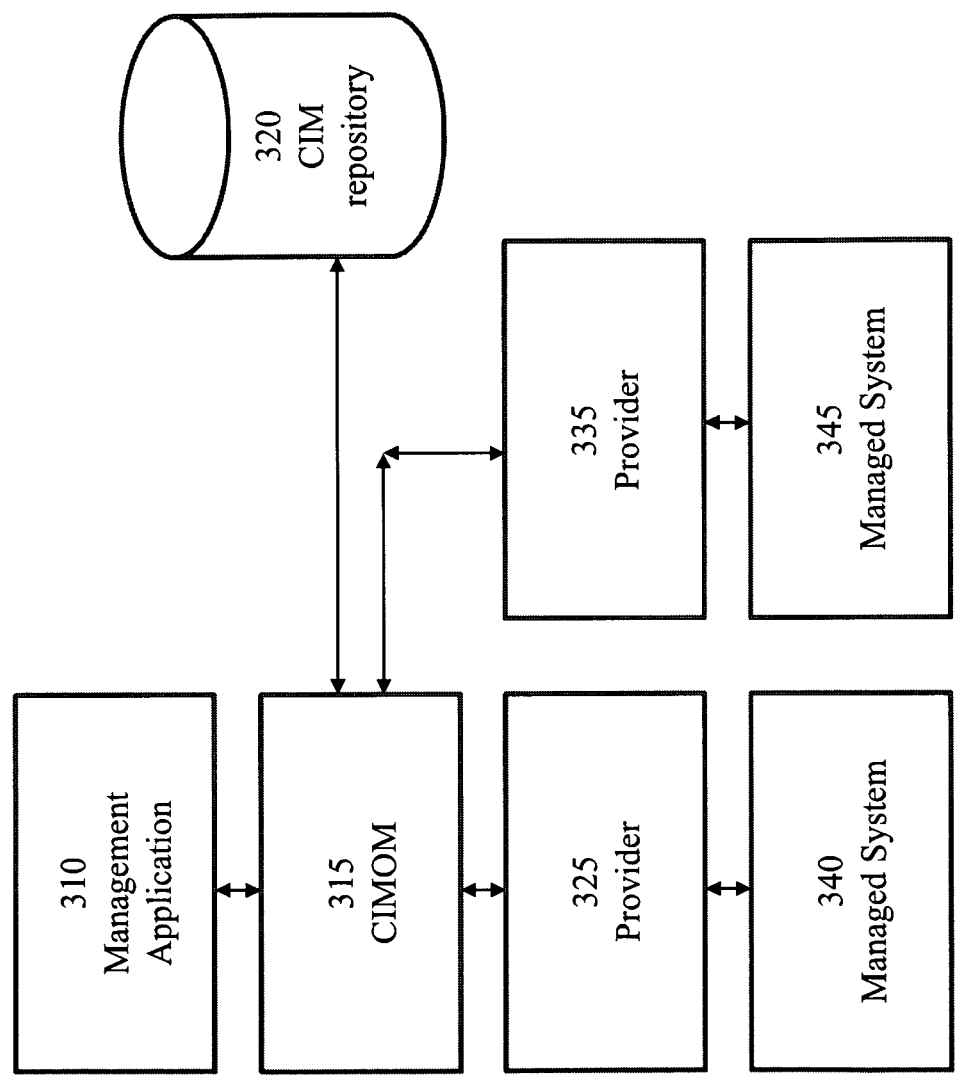
FIG. 3 illustrates an exemplary CIM system.

Any of the methods disclosed herein can be executed using computer readable code tangibly affixed to a computer readable medium and configured to have a physical effect. Additionally, the teachings can be implemented using a system, such as CIM architecture 300 as illustrated in FIG. 3.

Figure 4:
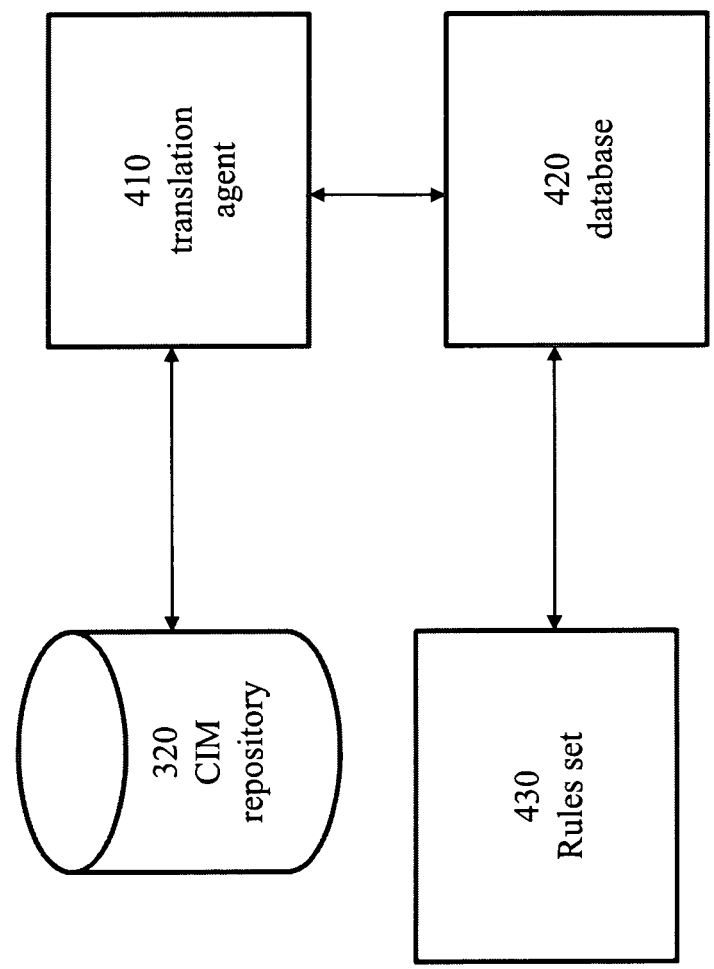
FIG. 4 illustrates a system for converting MOF files from a first CIM implementation to a second CIM implementation.

In one embodiment, the methods disclosed herein are performed at a translation agent 410, as illustrated in FIG. 4. FIG. 4 illustrates one embodiment of a system 400 for improving the compatibility of MOF files in a CIM system. System 400 includes CIM repository 320 as illustrated in FIG. 3 in communication with translation agent 410. Translation agent 410 is in communication with database 420. Database 420 either includes or is in communication with rule sets 430. Each rule set in the rule sets 430 includes instructions for translating MOFs written for various CIM implementations to a different CIM implementation.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for converting Common Information Management ("CIM") Managed Object Framework ("MOF") files from a first CIM implantation to a second CIM implementation, the method comprising:

receiving by a computing device via a network at least a first MOF file in a first format, the first format compatible with the first CIM implementation;

replacing in said first MOF file all OUT (false) parameters with ",";

after said replacing, transforming said first MOF file to a first XML file;

determining at least a first rule set associated with the second CIM implantation;

comparing the transformed file to the determined first rule set; and converting using an XSLT tool the transformed file to a second XML file converting the second XML file to a MOF compatible with the second CIM implementation.

2. The method of claim 1 wherein the first CIM implementation is incompatible with the second CIM implementation.

3. The method of claim 2 wherein the first CIM implementation is a Pegasus implementation, and wherein the second CIM implementation is a Window Managed Instrumentation.

4. The method of claim 1 wherein determining at least a first rule set associated with the second CIM implementation comprises:

identifying a database managing the first rule set;

accessing the identified database; and searching the identified database to determine the at least one first rule set.

5. The method of claim 4 wherein accessing the identified database comprises accessing the identified database over a network, and wherein the identified database is operated by a third party.

6. The method of claim 1 wherein the replacing at least a first parameter within the received file with a second parameter comprises executing a Java program utilizing at least one file edit class.

7. The method of claim 1 wherein transforming the file comprises executing an XSLT tool.

8. The method of claim 1 wherein creating the transformed file comprises converting the received file to an XML file.

9. A non-transitory computer usable medium tangibly storing computer readable code for converting Common Information Management ("CIM") Managed Object Framework ("MOF") files from a first CIM implementation to a second CIM implementation, the medium comprising:

computer readable code for receiving at least a first MOF file in a first format, the first format compatible with the first CIM implementation;

computer readable code for replacing in said first MOF file all OUT(false) parameters from said first MOF file with ";";

computer readable code for, after said replacing, transforming said first MOF file to a first XML file;

computer readable code for determining at least a first rule set associated with the second CIM implementation;

computer readable code for comparing the transformed file to the determined first rule set;

computer readable code for converting using an XSLT tool the transformed file to second XML file; and computer readable code for converting the second XML file to a MOF compatible with the second CIM implementation.

10. The medium of claim 9 wherein the first CIM implementation is incompatible with the second CIM implementation.

11. The medium of claim 10 wherein the first CIM implementation is a Pegasus implementation, and wherein the second CIM implementation is a Window Managed Instrumentation.

12. A medium of claim 9 wherein computer readable code for determining at least a first rule set associated with the second CIM implementation comprises:

computer readable code for identifying a database managing the first rule set;

computer readable code for accessing the identified database; and computer readable code for searching the identified database to determine the at least one first rule set.

13. The medium of claim 12 wherein computer readable code for accessing the identified database comprises computer readable code for accessing the identified database over a network, and wherein the identified database is operated by a third party.

14. The medium of claim 9 wherein computer readable code for replacing at least a first parameter within the received file with a second parameter comprises computer readable code for executing a Java program utilizing at least one file edit class.

15. The medium of claim 9 wherein computer readable code for transforming the file comprises computer readable code for executing an XSLT tool.

16. The medium of claim 9 wherein computer readable code for creating the transformed file comprises computer readable code for converting the received file to an XML file.

* * * * *